(12) United States Patent
Dege et al.

(10) Patent No.: US 6,688,470 B2
(45) Date of Patent: Feb. 10, 2004

(54) FOOD CARRIER

(75) Inventors: Paul T. Dege, Grandville, MI (US); Jim C. Nensewitz, Grand Rapids, MI (US); Edward W. Burmeister, Nunica, MI (US)

(73) Assignee: Oliver Products Company, Grand Rapids, MI (US)

( * ) Notice: Subject to any disclaimer, the term of this patent is extended or adjusted under 35 U.S.C. 154(b) by 64 days.

(21) Appl. No.: 10/073,832

(22) Filed: Feb. 11, 2002

(65) Prior Publication Data

US 2003/0150767 A1 Aug. 14, 2003

(51) Int. Cl.[7] .............................................. A45C 11/20
(52) U.S. Cl. ...................................... 206/545; 206/549
(58) Field of Search ................................ 206/541, 545, 206/547, 548, 549; 353/110; 220/521, 524, 592.2

(56) References Cited

U.S. PATENT DOCUMENTS

| | | |
|---|---|---|
| 786,077 A | 3/1905 | Wehmeier et al. |
| 1,006,135 A | 10/1911 | Schleicher |
| 1,304,700 A | 5/1919 | Otte |
| 1,371,007 A | 3/1921 | Urban |
| 1,437,509 A | 12/1922 | Genth |
| 1,511,613 A | 10/1924 | Joern |
| 1,895,278 A * | 1/1933 | Crawford .................... 383/96 |
| 1,895,864 A | 1/1933 | Ricci |
| 2,211,349 A | 8/1940 | Nye |
| 2,400,742 A | 5/1946 | Clerc |
| 2,531,444 A | 11/1950 | Lane |
| 2,612,651 A | 10/1952 | Roethel |
| 2,771,627 A | 11/1956 | Hammer |
| 2,812,227 A | 11/1957 | Hill |
| 2,895,782 A * | 7/1959 | Fragale ....................... 312/290 |
| 3,152,716 A | 10/1964 | Feldhahn |
| 3,204,866 A | 9/1965 | Brighton et al. |
| 3,531,169 A | 9/1970 | Hoffmann et al. |
| 3,842,982 A | 10/1974 | Joyce |
| 3,960,289 A | 6/1976 | Panicci |
| 4,022,319 A | 5/1977 | Jenkins |
| 4,216,862 A | 8/1980 | Daenen |
| 4,269,169 A | 5/1981 | Guibert |
| 4,328,254 A | 5/1982 | Waldburger |
| 4,435,434 A | 3/1984 | Caporaso |
| 4,486,981 A | 12/1984 | Billen |
| 4,498,584 A | 2/1985 | Newbury |
| 4,499,998 A | 2/1985 | Carlson |
| 4,543,471 A | 9/1985 | Anderson |
| 4,570,800 A | 2/1986 | Luckett |
| 4,609,084 A * | 9/1986 | Thomas ...................... 190/110 |
| 4,643,314 A | 2/1987 | Kidd |
| 4,659,154 A | 4/1987 | Jenkins |
| 4,694,961 A | 9/1987 | Menedez |
| 4,706,856 A * | 11/1987 | Jacober ...................... 224/153 |
| 4,812,054 A * | 3/1989 | Kirkendall .................. 383/110 |
| 4,840,271 A | 6/1989 | Garwood |
| 4,996,110 A | 2/1991 | Tanuma et al. |
| 5,084,028 A | 1/1992 | Kennedy et al. |
| 5,090,785 A | 2/1992 | Stamp |

(List continued on next page.)

Primary Examiner—Shian Luong
(74) Attorney, Agent, or Firm—Price, Heneveld, Cooper, DeWitt & Litton, LLP (57) ABSTRACT

A controlled temperature food carrier for carrying a plurality of meal trays includes an insulated housing constructed of flexible fabric and having a closed bottom, an open top and a front wall having an opening adjacent the bottom of the housing, wherein the opening is sized to preclude simultaneous removal of all of a plurality of meal containers, thereby limiting heat transfer from within the housing. The food carrier also including a lid constructed of a flexible fabric and operably connected with the housing by a living hinge between an open position and a closed position. The carrier further includes a door constructed of flexible fabric and operably connected with the housing by a living hinge and operable between an open position and a closed position.

35 Claims, 5 Drawing Sheets

U.S. PATENT DOCUMENTS

| | | | |
|---|---|---|---|
| 5,116,240 A | 5/1992 | Wischhusen et al. | |
| 5,134,754 A | 8/1992 | Vickers | |
| 5,176,522 A | 1/1993 | Robertson, Jr. | |
| 5,190,156 A | 3/1993 | Conaway et al. | |
| 5,295,365 A | 3/1994 | Redford | |
| 5,297,616 A | 3/1994 | Pralus | |
| D351,533 S | * 10/1994 | Lynam, Jr. | D7/605 |
| 5,411,140 A | 5/1995 | Byer | |
| 5,454,471 A | * 10/1995 | Norvell | 206/545 |
| 5,515,999 A | 5/1996 | Jo | |
| 5,526,907 A | * 6/1996 | Trawick et al. | 190/111 |
| D371,942 S | * 7/1996 | Lippincott et al. | D7/607 |
| 5,535,883 A | 7/1996 | Henderson | |
| 5,544,751 A | 8/1996 | Klodt et al. | |
| D376,044 S | * 12/1996 | Trawick et al. | D3/283 |
| 5,649,638 A | 7/1997 | Roy et al. | |
| 5,699,925 A | 12/1997 | Petruzzi | |
| 5,747,084 A | 5/1998 | Cochran et al. | |
| 5,772,063 A | 6/1998 | Gantz-Bloome | |
| 5,781,853 A | 7/1998 | Johnson | |
| D408,222 S | 4/1999 | Carter | |
| 5,957,325 A | 9/1999 | Montanez | |
| 6,116,456 A | 9/2000 | Davis | |
| 6,138,558 A | 10/2000 | Harrington | |
| 6,202,847 B1 | 3/2001 | Hardy et al. | |

* cited by examiner

FOOD CARRIER

BACKGROUND OF THE INVENTION

The present invention relates to a food carrier, and in particular to a food carrier for carrying a plurality of meal containers in a stacked orientation, and allowing for removal of the meal containers from a lower portion of the carrier.

Food carriers are used in a wide variety of applications, such as for carrying liquids and/or prepackaged foods. The food carriers typically include a top loading area, whereby meal containers or trays may be loaded within the food carrier, and a lower removal area from which the meal trays may be removed from within the food carrier.

Heretofore, food carriers have typically been constructed of a rigid, nondeformable material such as plastic or metal, and have significantly complicated designs. Specifically, the materials from which typical food carriers have been constructed are heavy and/or are prone to fracture and/or rupture if impacted or dropped. Most food carriers included housings constructed of multiple components that required assembly subsequent to fabrication of the individual parts. In addition, doors for previous food carriers were typically fastened via complicated hinge assemblies. Other designs allowed for "floating" doors/lids and provided no means of positive engagement. Further, no positive means for locking the doors in a closed position were provided to prevent the doors from accidentally opening and the associated meal trays from inadvertently falling out of the food carrier. Further, previous food carrier designs were difficult to clean and maintain.

SUMMARY OF THE INVENTION

One aspect of the present invention is to provide a controlled temperature food carrier for carrying a plurality of meal containers that includes an insulated housing constructed of flexible fabric and having a closed bottom, an open top and a front wall having an opening adjacent the bottom of the housing, wherein the opening is sized to preclude simultaneous removal of all of a plurality of meal containers from within the housing, thereby limiting heat transfer from within the housing. The food carrier also includes a lid constructed of flexible fabric and operably connected with the housing via a first living hinge movable between an open position, wherein the meal containers may be loaded into the housing via the top opening, and a closed position, wherein the lid covers the open top, thereby limiting heat transfer from within the housing. The food carrier further includes a door constructed of flexible fabric and operable connected with the housing by a second living hinge movable between an open position, wherein the meal containers may be removed from within the housing via the opening in the front wall, and a closed position, wherein the door covers the opening in the front wall, thereby limiting heat transfer from within the housing.

Another aspect of the present invention is to provide a controlled temperature food carrier for carrying a plurality of meal containers that includes an insulated housing having a closed bottom, an open top, a front wall having an opening adjacent the bottom of the housing, and a dividing partition, wherein the open top is sized to receive at least two side-by-side stacks of meal containers therethrough. The opening in the front wall is sized to allow removal of meal containers from either stack of meal containers and to preclude simultaneous removal of all of the meal containers, thereby limiting heat transfer from within the housing. The partition is adapted to extend beyond the side-by-side stacks of meal containers. The food carrier also includes a lid operably connected with the housing between an open position, wherein the meal containers may be loaded into the housing via the top opening, and a closed position, wherein the lid covers the top opening, thereby limiting heat transfer from within the housing. The food carrier further includes a door operably connected with the housing movable between an open position, wherein the meal containers may be removed from within the housing via the opening in the front wall, and a closed position, wherein the door covers the opening in the front wall, thereby limiting heat transfer from within the housing.

The present invention provides a controlled temperature food carrier for carrying a plurality of meal containers that is more durable, has a reduced manufacturing cost, includes an uncomplicated design that is economical to manufacture, is capable of a long operating life, and is particularly well adapted to the proposed use. In addition, the present inventive food carrier is easy to clean and maintain, and provides positive closure when in use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
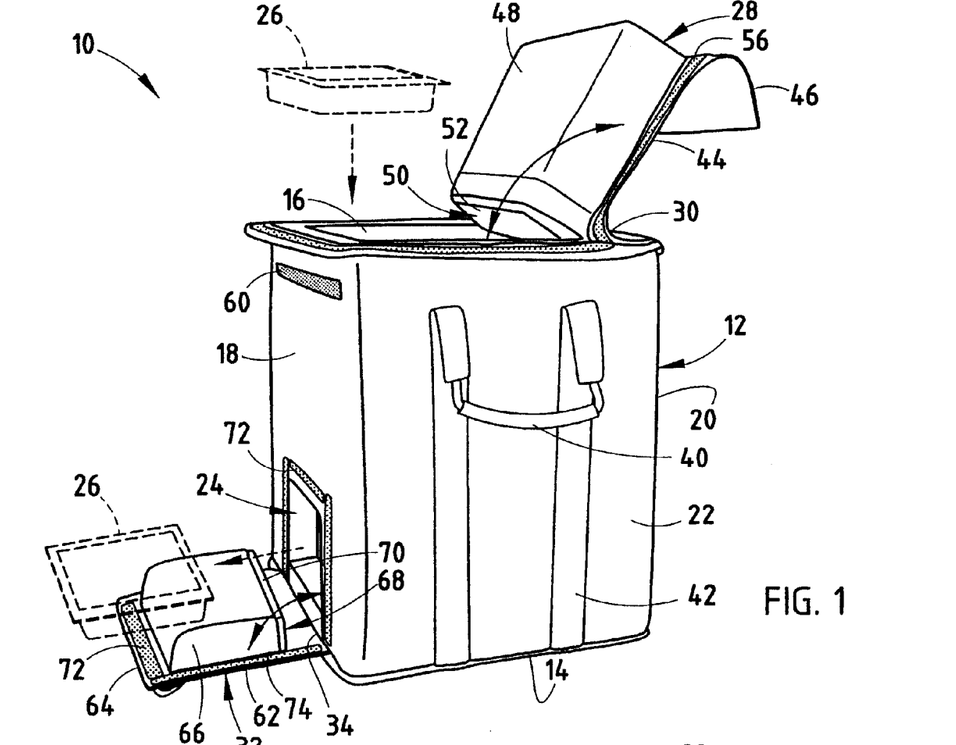
FIG. 1 is a perspective view of a food carrier embodying the present invention, with a lid and a door in an open position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a controlled temperature food carrier embodying the present invention. In the illustrated example, food carrier 10 includes a housing 12 constructed of a flexible fabric and having a closed bottom 14, an open top 16, a front wall 18, a back wall 20 and side walls 22. Front wall 18 includes an opening 24 located adjacent bottom 14 of housing 12. Opening 24 is sized to preclude simultaneous removal of all of a plurality of meal containers 26 from within housing 12, thereby limiting heat transfer from within housing 12. Food carrier 10 also includes a lid 28 constructed of a flexible fabric and operably connected with housing 12 by a living hinge 30. Lid 28 is movable between an open position as shown in FIG. 1, wherein meal containers 26 may be loaded into housing 12 via open top 16, and a closed position shown in FIG. 2, wherein lid 28 covers open top 16 of housing 12, thereby limiting heat transfer from within housing 12. Food carrier 10 further includes a door 32 constructed of flexible fabric hingedly connected with housing 12 by a living hinge 34. Door 32 is movable between an open position as shown in FIG. 1, wherein the meal containers 26 may be removed from within housing 12 via opening 24 within front wall 18 of housing 12, and a closed position as shown in FIG. 3, wherein door 32 covers opening 24 within front wall 18 of housing 12, thereby limiting heat transfer from within housing 12. Although in the illustrated example housing 12, lid 28 and door 32 are each constructed of a flexible fabric, other suitable materials may be utilized including cloth, woven mesh plastics, etc.

Figure 2:
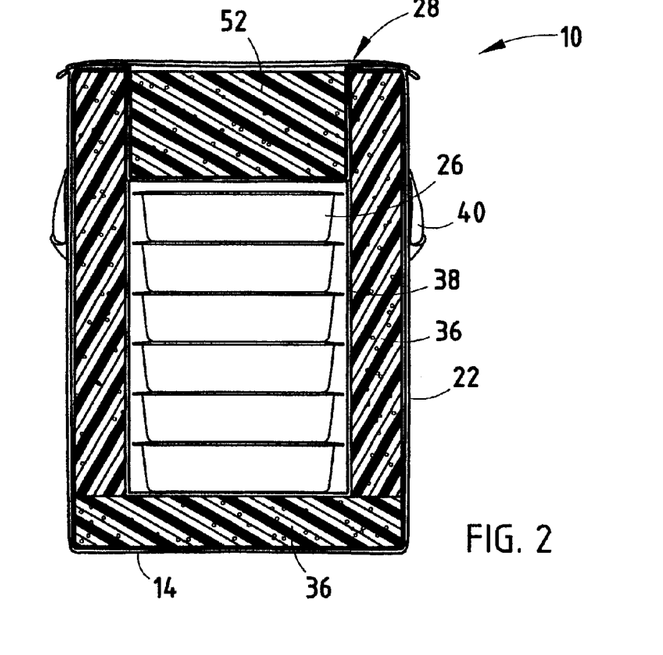
FIG. 2 is a cross-sectional front view of the food carrier.
Figure 3:
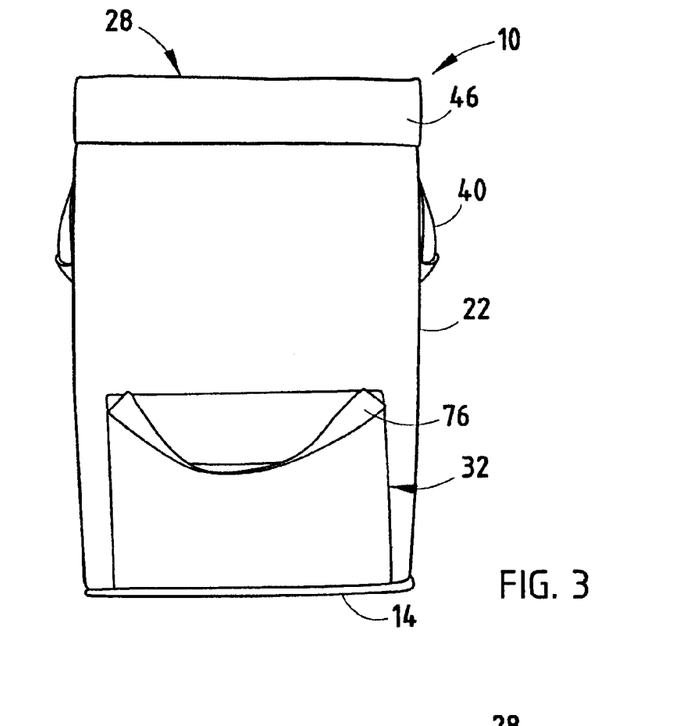
FIG. 3 is a front elevational view of the food carrier with the lid and the door in a closed position.

As best illustrated in FIG. 2, bottom 14, front wall 18, back wall 20 and side walls 22 are provided with a layer of insulation 36 therein. Housing 12 also includes a plastic coating 38 covering the interior surfaces of bottom 14, front wall 18, back wall 20 and side walls 22. As illustrated, coating 38 is constructed of a plastic material, however, other materials providing easy cleaning of the interior of housing 12 may be substituted therefore.

Figure 4:
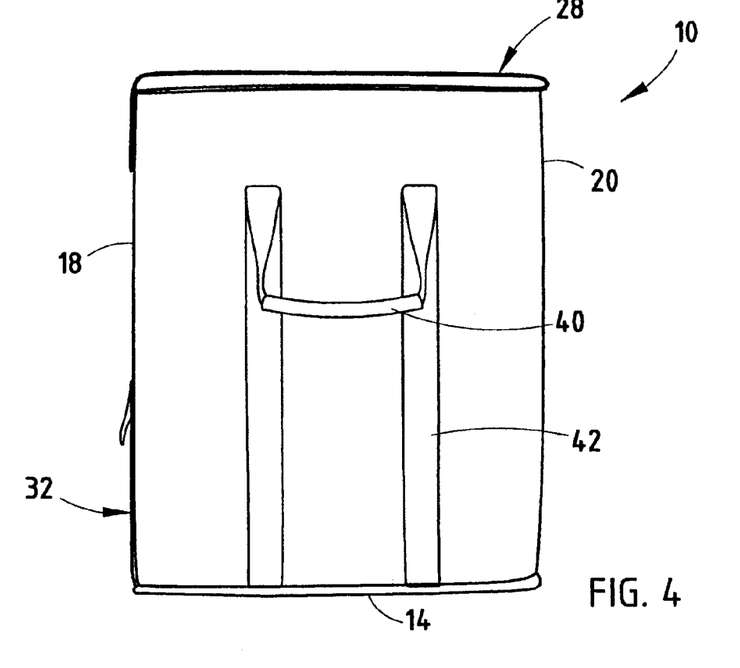
FIG. 4 is a side elevational view of the food carrier.
Figure 5:
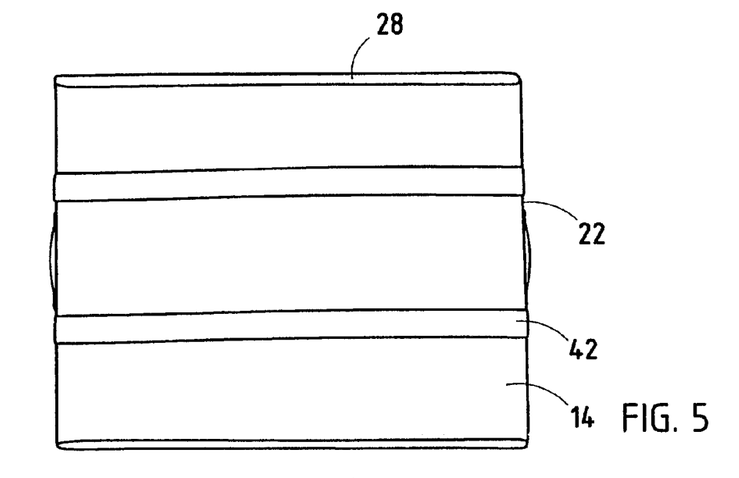
FIG. 5 is a bottom plan view of the food carrier.

Housing 12 also includes a pair of handles 40 (FIG. 4) extending outwardly from sidewalls 22. A pair of structural support straps 42 (FIG. 5) extend along sidewalls 22 and across bottom 14 of housing 12. As illustrated, handle 40 and support straps 42 are constructed of a single piece of a woven nylon webbing sewn to housing 12, however, multiple pieces of other materials suitable for such use may be substituted therefore and attached by any suitable means.

Figure 6:
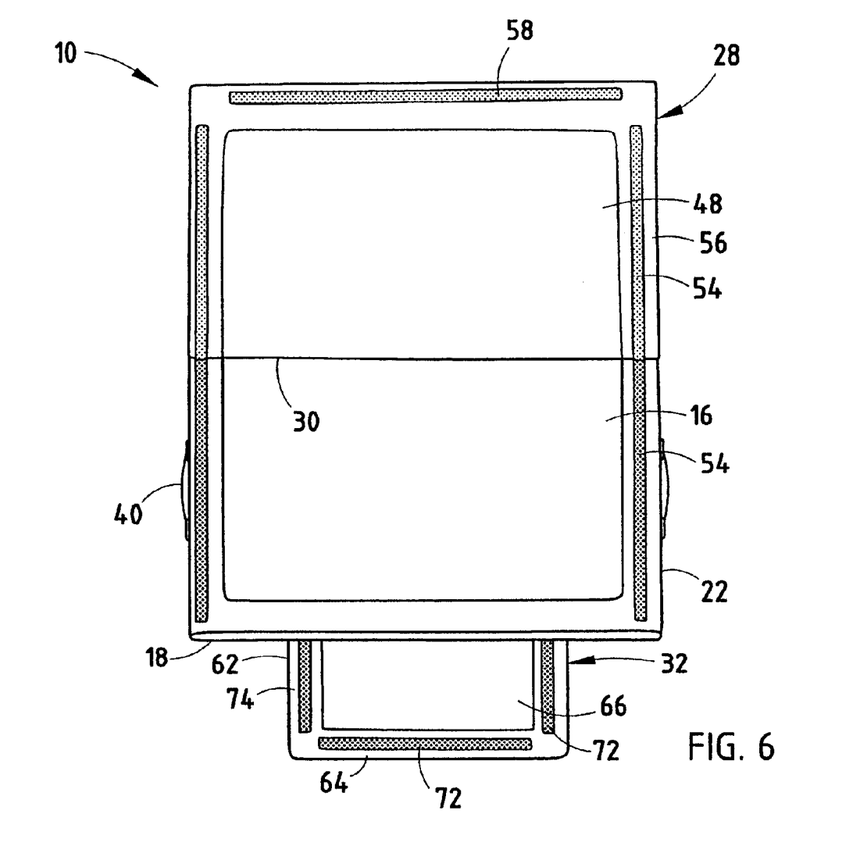
FIG. 6 is a top plan view of the food carrier with the lid and the door in an open position.

The lid 28 includes a panel section 44 that includes hinge 30 and an attachment flap 46. Hinge 30 extends rearwardly from panel section 44 and is sewn to top 16 of housing 12. Lid 28 further includes a centrally located, rectangularly-shaped envelope 48 attached to panel section 44 of lid 28 and defining an open end 50. A block of insulation 52 is inserted within open end 50 of envelope 48. In the illustrated example, the insulation block 52 has a rectangular shape that substantially matches the size of the opening within open top 16, thereby ensuring a snug fit of lid 28 within housing 12. Open end 50 of envelope 48 allows the insulation 52 to be easily replaced or removed for cleaning if soiled by the contents within meal containers 26, thereby insuring an antiseptic interior to housing 12. Lid 28 (FIG. 6) is held in the closed position via a plurality of hook-and-loop type fabric fasteners 54 that extend along side flaps 56 of lid 28 and along top 16 of housing 12. An additional hook-and-loop type fabric fastener 58 extends across attachment flap 46 of lid 28 and is connected with a mateable hook-and-loop type fabric fastener 60 extending across front wall 18 of housing 12 when lid 28 is in the closed position. Although in the illustrated example, the hook-and-loop type fabric fasteners 54, 58 and 60 are utilized to hold lid 28 in the closed position with housing 12, other suitable fasteners may be substituted therefore. Alternatively, hinge 30 of lid 28 may be fastened to top 16 of housing 12 via a hook-and-loop type fabric fastener, thereby allowing lid 28 to be completely removed from housing 12 to facilitate the loading of containers 26 therein.

The door 32 includes a panel section 62, an outwardly extending attachment flap 64, living hinge 34 and an attachment flap 64. Hinge 34 is an extension of panel section 62 and is sewn to front wall 18 of housing 12. Alternatively, a hook-and-loop type fabric connector (not shown) may be utilized to attach door 32 to housing 12, thereby allowing door 32 to be completely removed from housing 12. Door 32 further includes a centrally located, rectangularly-shaped envelope 66. Envelope 66 is sewn to panel section 62 of door 32. Envelope 66 defines an open end 68 within which an insulation block 70 may be placed within envelope 66. Open end 68 of envelope 66 allows insulation block 70 to be replaced or removed for cleaning if soiled by the contents within containers 26, thereby ensuring an antiseptic interior to housing 12. A plurality of hook-and-loop type fabric fasteners 72 extend along a pair of side flaps 72 of panel section 62, across attachment flap 64, and about opening 24 in front wall 18 of housing 12. Although hook-and-loop type fabric fasteners are utilized to hold door 32 in the closed position, other suitable fasteners may be utilized. Door 32 further includes a flexible fabric handle 76 that facilitates movement of door 32 between the open and closed positions.

In operation, lid 28 is moved to the open position, thereby allowing the plurality of meal containers 26 to be placed within housing 12 via open top 16. Lid 28 is then moved to the closed position and secured in place via fasteners 54, 58 and 60. Individual meal containers 26 are removed via opening 24 within front wall 18 of housing 12 by moving door 32 to the open position. As illustrated, only a single meal container 26 may be removed from within housing 12 via opening 24 at a time, however, opening 24 may be enlarged depending on the particular use and/or size of the meal containers 26.

Figure 7:
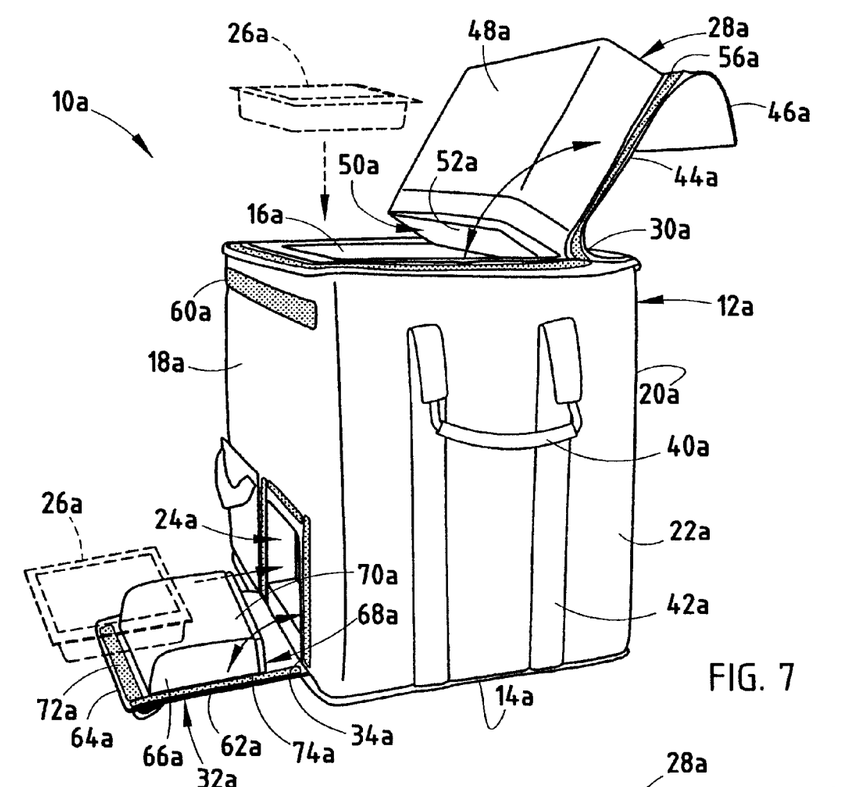
FIG. 7 is a perspective view of an alternative embodiment of the food carrier.
Figure 8:
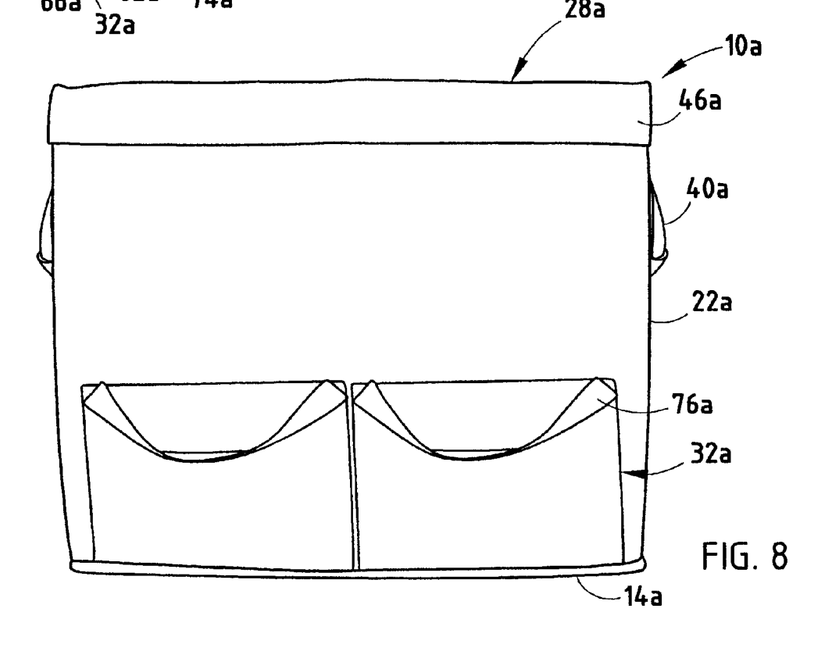
FIG. 8 is a front elevational view of the alternative embodiment of the food carrier.
Figure 9:
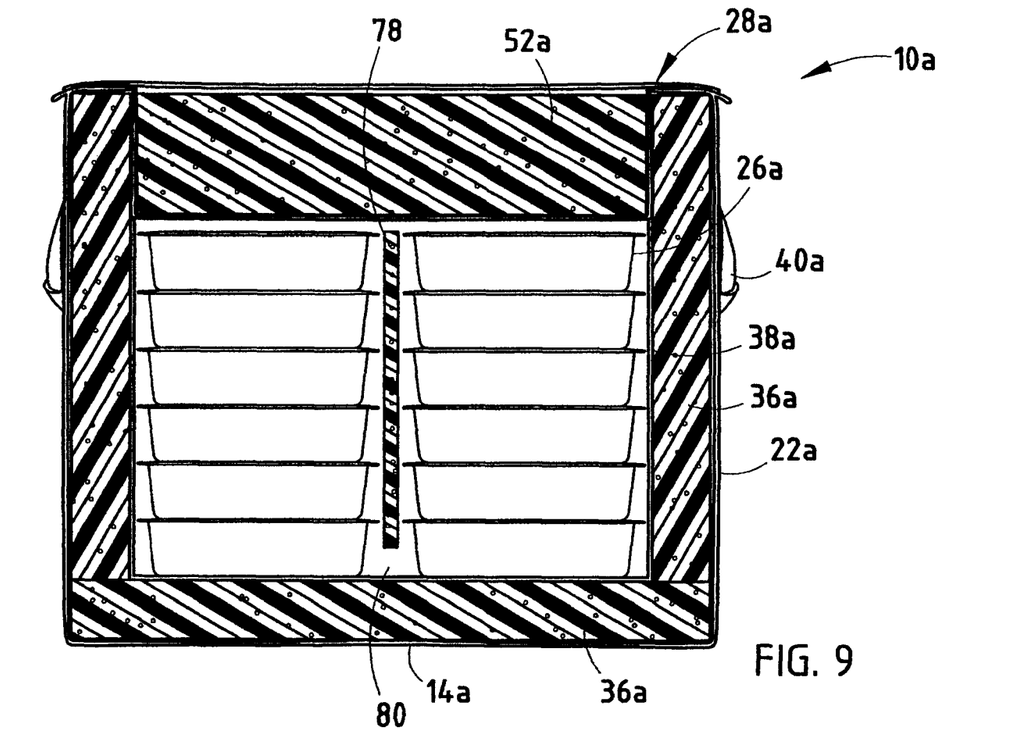
FIG. 9 is a cross-sectional front view of the alternative embodiment of the food carrier.

The reference numeral 10a(FIG. 7) generally designates another embodiment of the present invention. Since food carrier 10a is similar to the previously described food carrier 10, similar parts appearing in FIGS. 7–9 and FIGS. 1–6 respectively are represented by the same, corresponding reference numeral, except for the suffix "a" in the numerals of the latter. Food carrier 10a is similar in construction to food carrier 10 with the notable exceptions being that food carrier 10a is provided with a pair of doors 32a covering a pair of openings 24a located within front wall 18a of housing 12a, and that a dividing partition 78 (FIG. 8) is located within housing 12 and extends between front wall 18a and back wall 20a, and partially along the distance between lid 28a and bottom 14a, thereby providing a space 80 between bottom 14a and dividing partition 78. Space 80 allows for heat to evenly circulate within housing 12a. In use, two separate side-by-side stacks of meal containers 26a are placed within housing 12a on each side of dividing partition 78. Each stack of meal containers 26a may then be accessed and removed from within housing 12a via the associated opening 24a in front wall 18a of housing 12a. Each door 32a includes a handle 76a attached thereto facilitating the movement of door between the open and closed positions.

The present invention provides a controlled temperature food carrier for carrying a plurality of meal containers that is more durable, has a reduced manufacturing cost, includes an uncomplicated design that is economical to manufacture, is capable of a long operating life, and is particularly well adapted to the proposed use. In addition, the present inventive food carrier is easy to clean and maintain, and provides positive closure when in use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A controlled temperature food carrier for carrying a plurality of meal containers, comprising:
   an insulated housing constructed of flexible fabric and having a closed bottom, an open top and a front wall having an opening adjacent the bottom of the housing,
   a lid constructed of flexible fabric and operably connected with the housing by a first living hinge, the lid movable between an open position, and a closed position, wherein the lid covers the open top, thereby limiting heat transfer from within the housing;
   a door constructed of flexible fabric and operably connected with the housing by a second living hinge, the door movable between an open position, and a closed position, wherein the door covers the opening in the front wall, thereby limiting heat transfer from within the housing; and
   a plurality of meal containers vertically stacked upon one another in the housing; wherein the meal containers and open top of the housing are adapted to permit placement of the meal containers in the housing through the open top without tipping of the meal containers, and wherein the meal containers and the opening in the front wall are configured such that the meal containers can only be removed through the opening in the front wall one at a time.

2. A controlled temperature food carrier for carrying a plurality of meal containers, comprising:
   an insulated housing constructed of flexible fabric and having a closed bottom, an open top and a front wall having an opening adjacent the bottom of the housing, the opening being sized to preclude simultaneous removal of all of a plurality of meal containers from within the housing, thereby limiting heat transfer from within the housing;
   a lid constructed of flexible fabric and operably connected with the housing by a first living hinge, the lid movable between an open position, wherein the meal containers may be loaded into the housing via the open top, and a closed position, wherein the lid covers the open top, thereby limiting heat transfer from within the housing;
   a door constructed of flexible fabric and operably connected with the housing by a second living hinge, the door movable between an open position, wherein the meal containers may be removed from within the housing via the opening in the front wall, and a closed position, wherein the door covers the opening in the front wall, thereby limiting heat transfer from within the housing, wherein the lid includes an interior pocket, and wherein the interior pocket removably receives an insulation pad therein.

3. The food carrier of claim 2, wherein the interior pocket is constructed of flexible fabric.

4. The food carrier of claim 3, wherein the interior pocket is sewn to the lid and includes one open side.

5. The food carrier of claim 4, wherein the lid is held in the closed position by a hook-and-loop fabric fastener.

6. The food carrier of claim 5, wherein the door includes an interior pocket, and wherein the interior pocket of the door removably receives an insulation pad therein.

7. The food carrier of claim 6, wherein the interior pocket of the door is constructed of flexible fabric.

8. The food carrier of claim 7, wherein the interior pocket of the door is sewn to the door and includes one open side.

9. The food carrier of claim 8, wherein the door is held in the closed position by a hook-and-loop fabric fastener.

10. The food carrier of claim 9, further including:
    a pair of handles fixedly attached to the housing and juxtaposed across the housing, and wherein the handles are constructed of flexible fabric.

11. The food carrier of claim 10, further including:
    at least one structural supporting strap that is fixedly attached to and extends across the bottom of the housing.

12. The food carrier of claim 11, wherein the handles and the supporting strap are constructed as a single piece.

13. The food carrier of claim 1, wherein the lid is held in the closed position by a hook-and-loop fabric fastener.

14. The food carrier of claim 1, wherein the door includes an interior pocket, and wherein the interior pocket of the door removably receives an insulation pad therein.

15. The food carrier of claim 14, wherein the interior pocket of the door is constructed of flexible fabric.

16. The food carrier of claim 1, wherein the door is held in the closed position by a hook-and-loop fabric fastener.

17. The food carrier of claim 1, further including:
    a pair of handles fixedly attached to the housing and juxtaposed across the housing, and wherein the handles are constructed of flexible fabric.

18. The food carrier of claim 1, further including:
    at least one structural supporting strap that is fixedly attached to and extends across the bottom of the housing.

19. The food carrier of claim 1, further including:
    a pair of handles constructed of a flexible fabric fixedly attached to and juxtaposed across the housing; and
    at least one structural supporting strap that extends across the bottom of the housing, wherein the handles and the supporting strap are constructed as a single piece.

20. The food carrier of claim 1, wherein the housing, the lid and the doors are each constructed of a flexible fabric.

21. The food carrier of claim 20, wherein the lid is held in the closed position by a hook-and-loop fabric fastener.

22. The food carrier of claim 21, wherein each door is held in the closed position by a hook-and-loop fabric fastener.

23. The food carrier of claim 20, further including:
    a pair of handles fixedly attached to the housing and juxtaposed across the housing, and wherein the handles are constructed of a flexible fabric.

24. The food carrier of claim 20, further including:
    at least one structural supporting strap that is fixedly attached to and extends across the bottom of the housing.

25. The food carrier of claim 20, further including:
    a pair of handles constructed of a flexible fabric and juxtaposed across the housing; and at least one structural supporting strap that extends across the bottom of the housing, wherein the handles and the supporting strap are constructed as a single piece.

26. A controlled temperature food carrier for carrying a plurality of meal containers, comprising:
    an insulated housing having a closed bottom, an open top, a front wall having a pair of openings adjacent the bottom of the housing, and a dividing partition, the open top being sized to receive at least two side-by-side stacks of meal containers therethrough, the opening in the front wall being sized to allow removal of meal containers from either stack of meal containers and to preclude simultaneous removal of all of the meal containers, thereby limiting heat transfer from within the housing, the partition located within the housing and adapted to extend between the side-by-side stacks of meal containers and having a lower edge vertically spaced from the bottom to define a gap;

a lid operably connected with the housing, the lid movable between an open position, wherein the meal containers may be loaded into the housing via the open top, and a closed position, wherein the lid covers the open top, thereby limiting heat transfer from within the housing; and a pair of doors operably connected with the housing, each of the doors movable between an open position, wherein the meal containers may be removed from within the housing via the associated opening in the front wall, and a closed position, wherein the door covers the associated opening in the front wall, thereby limiting heat transfer from within the housing.

27. The food carrier of claim 26, wherein the housing is constructed of a flexible fabric.

28. The food carrier of claim 27, wherein the lid is constructed of a flexible fabric.

29. The food carrier of claim 28, wherein the lid is connected to the housing by a first living hinge.

30. The food carrier of claim 29, wherein the lid is held in the closed position by a hook-and-loop fabric fastener.

31. The food carrier of claim 30, wherein the lid includes an interior pocket, and wherein the interior pocket removably receives an insulation pad therein.

32. The food carrier of claim 31, wherein each door is constructed of a flexible fabric.

33. The food carrier of claim 32, wherein each door is connected to the housing by a second living hinge.

34. The food carrier of claim 33, wherein each door is held in the closed position by a hook-and-loop fabric fastener.

35. The food carrier of claim 34, wherein each door includes an interior pocket, and wherein the interior pocket of each door removably receives an insulation pad therein.

* * * * *